(12) United States Patent
Hsu et al.

(10) Patent No.: US 8,765,229 B2
(45) Date of Patent: Jul. 1, 2014

(54) METHOD FOR PRODUCING POROUS THIN FILM WITH VARIABLE TRANSMITTANCE

(71) Applicant: National Tsing Hua University, Hsinchu (TW)

(72) Inventors: Wen-Kuang Hsu, Hsinchu (TW); Ying-Tzu Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/674,462

(22) Filed: Nov. 12, 2012

(65) Prior Publication Data

US 2014/0065314 A1 Mar. 6, 2014

(30) Foreign Application Priority Data

Aug. 30, 2012 (TW) .............................. 101131475 A

(51) Int. Cl.
| | | |
|---|---|---|
| *B05D 5/06* | (2006.01) | |
| *B05D 1/00* | (2006.01) | |
| *B05D 3/04* | (2006.01) | |
| *B05D 3/12* | (2006.01) | |
| *C08K 3/16* | (2006.01) | |
| *C08L 35/04* | (2006.01) | |

(52) U.S. Cl.
CPC *B05D 5/065* (2013.01); *B05D 1/00* (2013.01); *B05D 3/0486* (2013.01); *B05D 3/0493* (2013.01); *B05D 3/12* (2013.01); *B05D 2203/35* (2013.01); *B05D 2301/00* (2013.01); *B05D 2401/10* (2013.01); *C08K 3/16* (2013.01); *C08L 35/04* (2013.01)
USPC ........ 427/389.7; 427/600; 427/162; 427/165; 427/294; 427/336; 427/350; 427/352; 524/401; 524/565

(58) Field of Classification Search
None
See application file for complete search history.

(56) References Cited

U.S. PATENT DOCUMENTS

| 7,172,075 B1 * | 2/2007 | Ji .................................. 210/490 |
| 2012/0181228 A1 * | 7/2012 | Kang et al. .................... 210/490 |
| 2013/0105383 A1 * | 5/2013 | Tang et al. ..................... 210/490 |

FOREIGN PATENT DOCUMENTS

| CN | 1552508 | * 12/2004 |
| CN | 101402023 | * 4/2009 |
| IN | 218226 | * 11/2005 |

OTHER PUBLICATIONS

Phadke et al, Journal of Polymer Science: Part B: Polymer Physics, vol. 43, pp. 2074-2085, 2005.*
Fen'ko et al, Petroleum Chemistry, vol. 51, pp. 527-535, 2011.*

* cited by examiner

*Primary Examiner* — Erma Cameron
(74) *Attorney, Agent, or Firm* — Chun-Ming Shih

(57) ABSTRACT

A method for producing a porous thin film with variable transmittance, includes placing a polymer into an oven for an drying process to remove water vapor from the polymer and obtain a dry polymer; mixing the dry polymer, a salt and a solvent in accordance with a mixing ratio so as to obtain a first mixed solution; placing the first mixed solution into an ultrasonic vibrator, dissolving the salt to form a second mixed solution; coating the second mixed solution on a glass plate to form a solution thin film; placing solution thin film into an exhaust cabinet to obtain a composite thin film; and washing the composite thin film to remove the salt from the composite thin film to obtain a porous thin film wherein the polymer is a polyacrylonitrile, the salt is a lithium chloride, the porous thin film changes its transmittance via dry and wet state.

8 Claims, 4 Drawing Sheets

METHOD FOR PRODUCING POROUS THIN FILM WITH VARIABLE TRANSMITTANCE

BACKGROUND OF THE INVENTION

1. Field of the Invention

This invention is related to a method for producing a porous thin film with variable transmittance, and more particular to a porous thin film produced by means of water absorption characteristic of salt which can change the light transmittance of the porous thin film under a dry state and a hydrous state.

2. Description of Related Art

The conventional optical transmittance and reflectance control technology is to add an electric field to a general liquid crystal layer made of a liquid crystal material in the liquid crystal display, which twists the liquid crystal molecules and changes the polarization direction of a light propagation, and then the polarization direction of a light propagation is filtered by the polarizer, so as to control the transmittance.

For example, photochromic lenses are plated a compound thin film via a glass lens. The compound thin film produces a chemical reaction by ultraviolet radiation, and thereby the chemical structure is changed, resulting in the corresponding change of the optical transmittance, reflectance or absorption rate.

In another example, the electrochromic technology uses an added electric field to allow the ions to be injected into a photochromic material, which changes the color of the photochromic material, and further changes light transmittance, reflectance and absorption rate of the photochromic material. The electrochromic technology can be applied in the areas of green energy industry and electronic goods, such as the electrochromic glasses used in construction materials, which are used to regulate the light transmittance between outdoors and indoors; and the electrochromic technology can be also applied to the flexible electronic paper.

However, in order to advocate the green energy technology, the above mentioned control technology of the liquid crystal polarization and the electrochromic technology need external power to work, which needs more which needs more power while in use, and the manufacturing costs of both technologies are also high.

The transmittance change in the compound thin film on the photochromic lenses is only a change in color, the compound thin film still belongs to a transparent film, so that its application range is limited. Therefore, how to develop a thin film with low usage cost, low manufacturing cost and more than 50% transmittance change are the lessons the industry needs to resolve.

SUMMARY OF THE INVENTION

The objective of the present invention is to provide a porous thin film with variable transmittance, which is manufactured by mixing a polyacrylonitrile and a lithium chloride, controlling the humidity, coating, drying, and washing, thereby changing the visible light transmittance of the porous thin film via dry or wet state.

In order to achieve the above purposes, the technical means of the present invention are:

placing a polymer into an oven for an drying process to remove water vapor from the polymer and obtain a dry polymer; mixing the dry polymer, a salt and a solvent in accordance with a mixing ratio so as to obtain a first solution; placing the first solution into an ultrasonic vibrator, dissolving the salt to form a second solution; coating the second solution on a glass plate to form a solution thin film on the glass plate; placing the solution thin film in an exhaust cabinet to obtain a composite thin film, so that the solvent was completely volatilized; and finally washing the composite thin film to remove the salt from the composite thin film to obtain a porous thin film.

Wherein the polymer is the polyacrylonitrile; the salt is lithium chloride; and the solvent is made from dimethyl formamide and dimethyl-acetylated amine.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
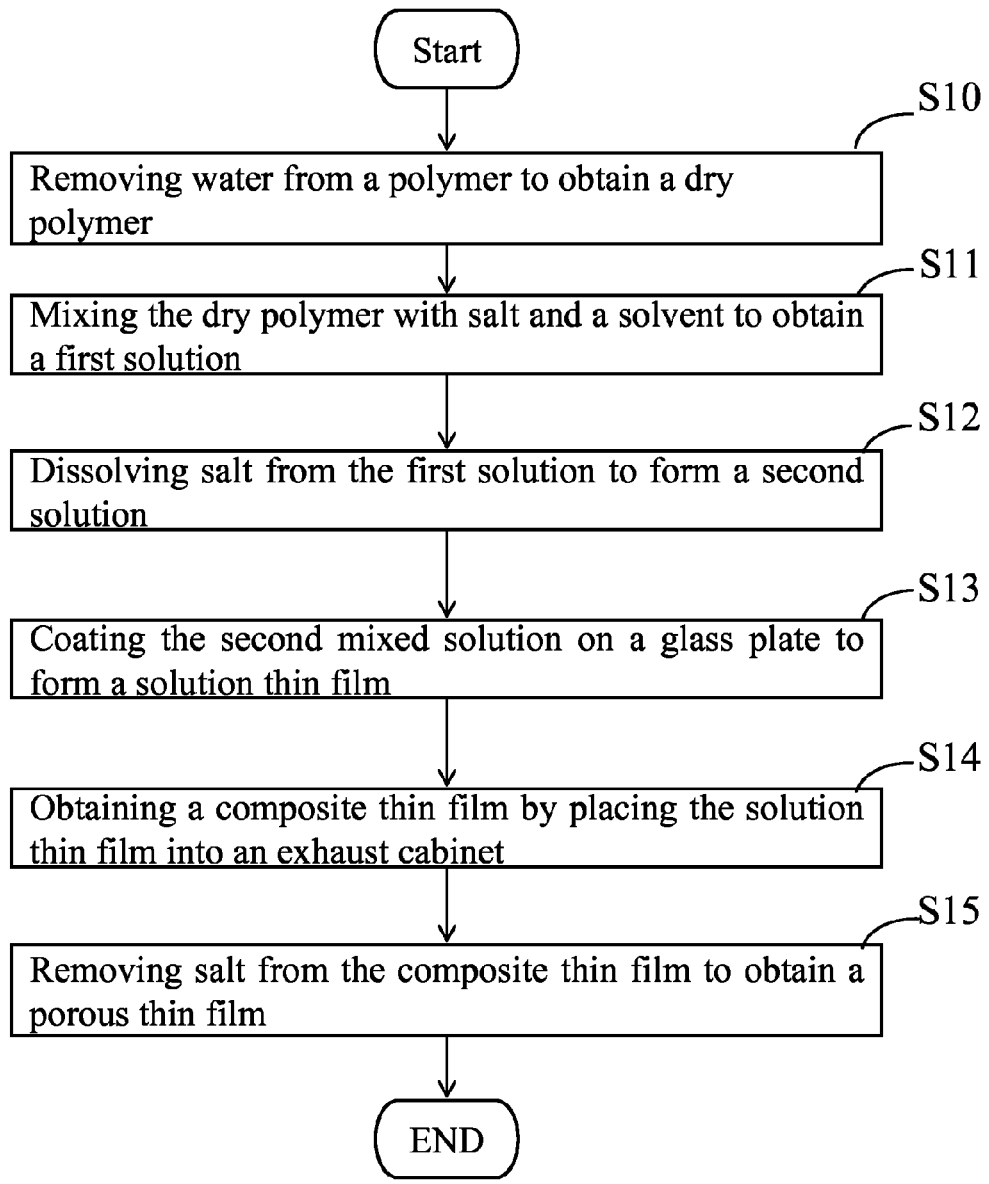
FIG. 1 is a flowchart illustrating the method for producing the porous thin film with variable transmittance of the present invention.
Figure 2:
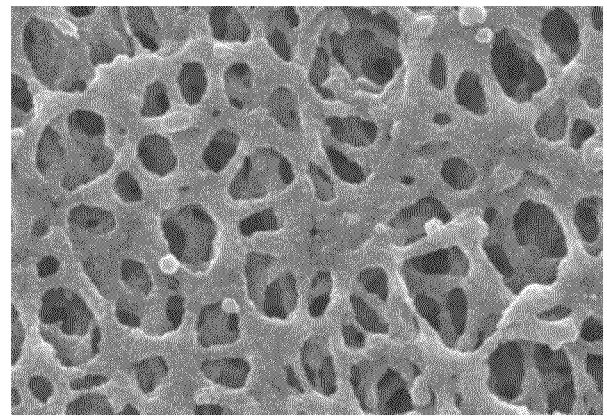
FIG. 2 is a SEM image showing a porous thin film provided by the present invention.

Please refer to FIG. 1 to FIG. 2, which is a preferred embodiment providing a method for producing a porous thin film with variable transmittance, having the following steps:

First of all, in step S10, a polymer is placed in an oven to remove water vapor from the polymer to obtain a dry polymer, wherein the polymer is a polyacrylonitrile, and then goes to step S11.

Step S11, the dry polymer were mixed with a salt and a solvent in accordance with a mixing ratio (as shown in the following Table 1) so as to obtain a first solution, wherein the salt is a lithium chloride; the solvent is one selected from the group consisting of: dimethyl-formamide and dimethyl-acetylated amine, and then goes to step S12.

Step S12, placing the first solution into an ultrasonic vibrator, completely dissolving the salt via ultrasound to form a second solution, and then goes to step S13.

Step S13, coating the second solution uniformly on a glass plate to form a solution thin film with uniform thickness on the glass plate, and then goes to step S14.

Step S14, placing the solution thin film in an exhaust cabinet to let the solvent be volatilized to obtain a composite thin film, and then goes to step S15.

Step S15A removing the salt thereof by such as washing so as to obtain a porous thin film composed of the polymer (as shown in FIG. 2).

TABLE 1 a composition table of lithium chloride/polyacrylonitrile solution

| LiCl (wt %) | LiCl (g) | PAN (g) | DMAc (ml) | DMF (ml) |
|---|---|---|---|---|
| 10 | 0.2 | 1.8 | 5 | 5 |
| 20 | 0.4 | 1.6 | 5 | 5 |
| 30 | 0.6 | 1.4 | 5 | 5 |
| 40 | 0.8 | 1.2 | 5 | 5 |
| 50 | 1.0 | 1.0 | 5 | 5 |
| 60 | 1.2 | 0.8 | 5 | 5 |
| 70 | 1.4 | 0.6 | 5 | 5 |
| 80 | 1.6 | 0.4 | 5 | 5 |
| 90 | 1.8 | 0.2 | 5 | 5 |

In the preferred embodiment, the mixing ratio is prepared in accordance with the compound solution of Table 1, for example, such as respectively using lithium chloride (LiCl) 0.2 gm (g), poly acrylonitrile (PAN) 1.8 gm, dimethyl-acetylated amine 5 ml and dimethyl formamide 5 ml to form the first mixed solution of lithium chloride with doping level 10 wt % and then placing the first mixed solution into the ultrasonic vibrator to dissolve 0.2 g lithium chloride therein, so as to form the second mixed solution; with respect to the rest of the mixing ratio, please refer to table 1, which won't be repeated again.

Wherein the polyacrylonitrile (PAN) is also called as acrylic yarn, having light weight and elasticity, and a strong dipole key, which can be dissolved in the polar solution of dimethyl formamide (DMF) and dimethyl acetylation amine (DMAC);

Lithium Chloride (LiCl) is a metal salt, having high moisture absorption in the air, thereby the amount of water adsorbed varies as the relative humidity in the air changes; both parameters of the N, N-Dimenthylformamide (DMF) and the N, N-Dimenthylacetamide (DMAc) are similar, so that they have good miscible capacity; and in step S13 of coating the second solution, relative humidity in the environment is regulated by a humidity control apparatus.

Furthermore, in a preferred embodiment, besides using lithium chloride, the salt including: calcium chloride (CaCl2), magnesium chloride (MgCl2), potassium acetate (CH3COOK), sodium acetate (CH3COONa), potassium (K2CO3) and sodium carbonate (Na2CO3); besides using polyacrylonitrile, the polymer including: polytetrafluoroethylene (PTFE, commonly known as Teflon), a hydrophilic thermoplastic polyurethanes ester (TPU Thermoplastic Polyurethane), polyamides (PA, Polyamide, commonly known as Nylon), polyethylene (PE) and polyethylene terephthalate (PET); besides using dimethyl formamide and dimethyl toxidromes, the solvent including: dimethyl sulfoxide (DMSO), toluene and acetone.

With respect to the humidity control apparatus, which includes a nitrogen bottle, a watering part and a cavity (not shown in the figure). The nitrogen bottle connects to the cavity by using a tube, and the tube connects to the watering part.

The nitrogen bottle generates and passes nitrogen gas into the cavity via the tube and the watering part and the water vapor is brought into the cavity by nitrogen gas, and that controlling the flow rate of the nitrogen or the water temperature can control the relative humidity of the cavity of. The relative humidity range of the coating procedure used in the present invention is 10 to 95%.

The porous thin film provided in the preferred embodiment can be divided into a dry porous thin film and an aqueous porous thin film in accordance with the wet and dry states, wherein the aqueous porous film is a hydrous state of the dry porous thin film after the dry porous thin film is soaked in a solution. After the dry porous thin film is washed to remove the lithium chloride, the porous thin film loses the capability of absorbing water, and the porous thin film renders moisture-free state after drying, which increases the visible light scattering extent of the pores in the porous thin film, which allows the transmittance of the dry porous thin film to be decreased.

Further, the refraction index of the water in the aqueous porous thin film is close to the polyacrylonitrile, so that the aqueous porous thin film can not generate the scattering effect, which allows the visible light to penetrate the aqueous porous thin film, leading to increase the transmittance of the aqueous porous thin film.

The porous thin film as described above, whose optical phenomena can be explained by characteristic analysis, including but not limited to, a microstructure analysis, a porosity analysis and an optical analysis.

The microstructure analysis uses a scanning electron microscope (SEM) to observe the surface appearance of the porous thin film, and the resolution can be up to 1.5 nm.

Figure 3:
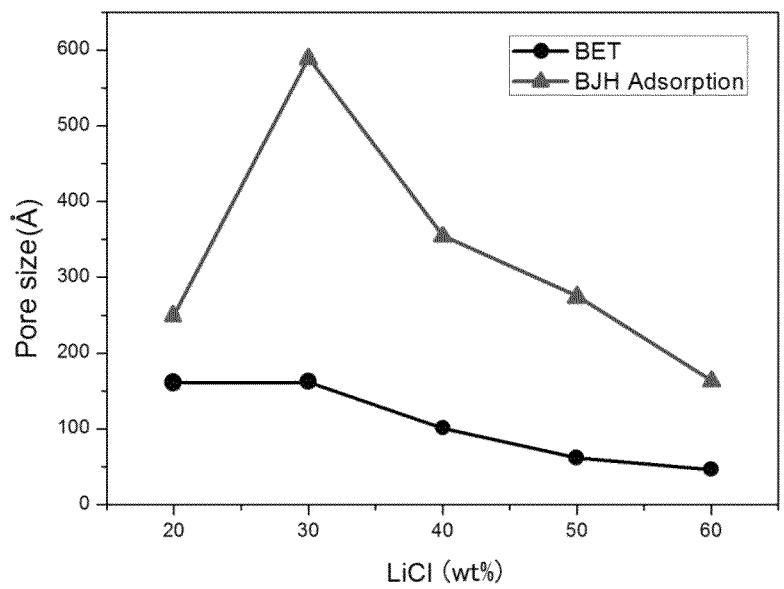
FIG. 3 is a coordinate graph showing the aperture size vs. lithium chloride doping concentration of the porous thin film provided by the present invention.
Figure 4:
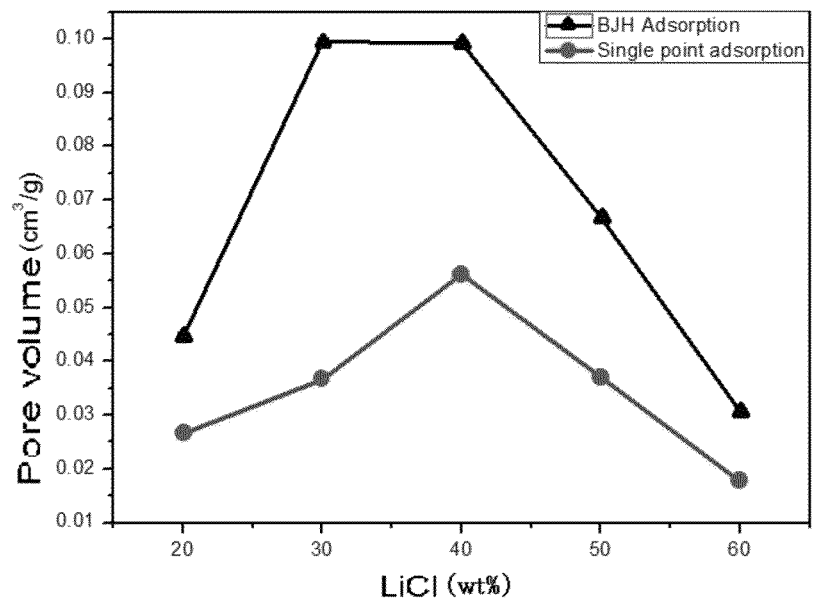
FIG. 4 is a coordinate graph showing the pore volume vs. lithium chloride doping concentration of the porous thin film provided by the present invention.
Figure 5:
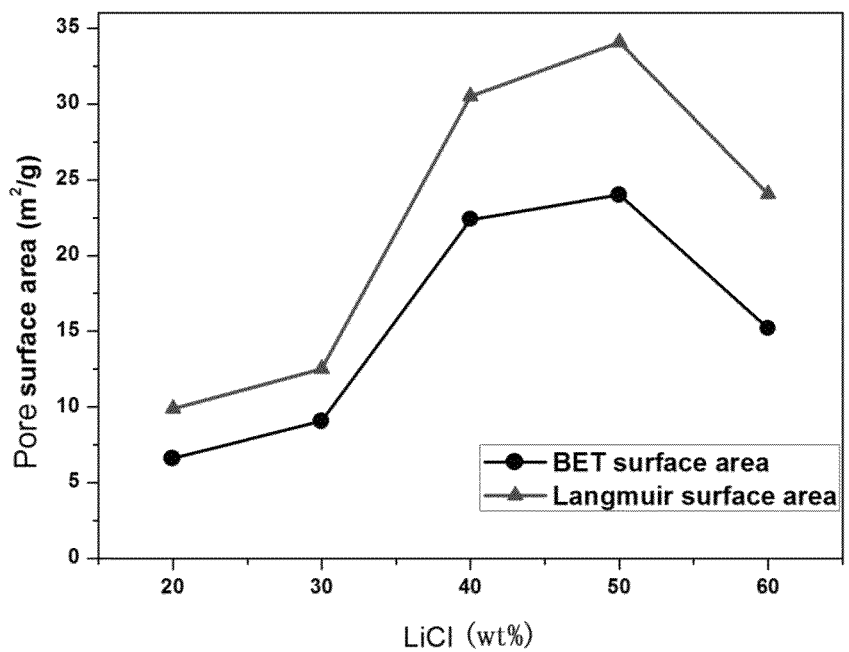
FIG. 5 is a coordinate graph showing the pore surface area vs. lithium chloride doping concentration of the porous thin film provided by the present invention.

As shown in FIG. 2, which is a porous thin film surface produced by the lithium chloride doped with the polyacrylonitrile. In practice, as the concentration of the lithium chloride rises, the pore size of the porous thin film changes from small to large, but the number is decreased. And the porous thin film of the present invention respectively made from 10 wt %, 20 wt %, 30 wt %, 40 wt %, 50 wt % and 60 wt % of lithium chloride content is measured by a high-resolution surface area analyzer. The pore size, pore volume and the pore surface area (or a surface area) data are as shown in FIG. 3, FIG. 4 and FIG. 5, wherein the two curves represent the results of the measurements of using the above-mentioned gas adsorption method. The pore size of the porous thin film is proportional to the pore volume thereof, and the aperture size of the porous thin film is inversely proportional to the surface area thereof; i.e. in the same volume of the porous thin film, the larger aperture it has, the larger pore volume it contains, but its pore surface area is smaller, and vice versa.

It is noted that doping with 30 wt %, 40 wt %, 50 wt % lithium chloride is in accordance with the above mentioned trends of the two curves as shown in FIG. 3, FIG. 4 and FIG. 5. That's because the chlorinated lithium doping amounts of 10 wt % and 20 wt % are less and 60 wt % thereof is over, which allow the porous thin film to have low pore density or uneven distribution. Therefore the preferred doped ratio of lithium chloride of the present invention is 30 wt %, 40 wt % and 50 wt %.

The optical analysis uses an ultraviolet-visival light spectrophotometer (UV-Vis) to measure the porous thin film produced by the lithium chloride with the proportion of 10 wt %, 20 wt %, 30 wt %, 40 wt %, 50 wt % and 60 wt % respectively, and to obtain a respective transmittance spectrum (not shown in the figure), the measurement range is the visible light ranging from 380 to 780 nm.

Figure 6:
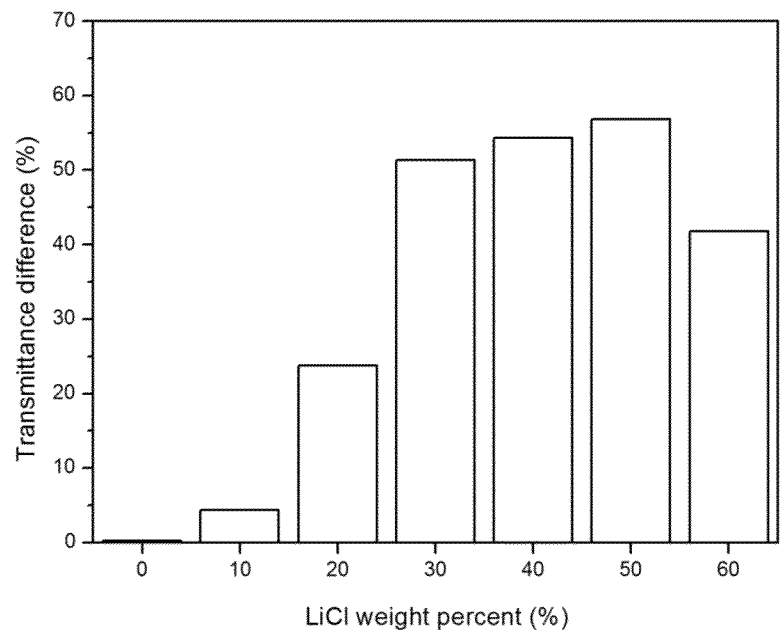
FIG. 6 is a coordinate graph showing the transmittance change vs. lithium chloride doping concentration of the porous thin film provided by the present invention.

Further, the transmittance spectrum measured by the dry porous thin film (10, 20, 30, 40, 50, 60 wt % of lithium chloride) and the aqueous porous thin film (10, 20, 30, 40, 50, 60 wt % of lithium chloride) can be drawn as FIG. 6 in accordance with the different transmittance caused by the respective proportion, it is noted that porous thin film doped with respective 30 wt %, 40 wt %, 50 wt % of lithium chloride has preferred pore structure, which is able to scatter a large number of visible light, and be used as the application of the transmittance or reflectance changes between the dry and water saturated state.

From the above mentioned, it is noted that the preferred embodiment of the present invention provides a method for producing a porous thin film with variable transmittance, includes: placing a polymer into an oven for an drying process to remove water vapor from the polymer and obtain a dry polymer; mixing the dry polymer, a salt and a solvent in accordance with a mixing ratio so as to obtain a first mixed solution; placing the first mixed solution into an ultrasonic vibrator, dissolving the salt to form a second mixed solution; coating the second mixed solution on a glass plate to form a solution thin film; placing the solution thin film into an exhaust cabinet to obtain a composite thin film; and washing the composite thin film to remove the salt from the composite thin film to obtain a porous thin film, wherein the polymer is a polyacrylonitrile, the salt is a lithium chloride, the porous thin film changes its transmittance via dry and wet state. Because of the visible light scattering effect, The transmittance of the porous thin film in dry state is low, on the contrary, to inhibit the effect of the occurrence of light scattering under the hydrous state, so that the transmittance of the porous film increased. Therefore, the porous thin film does not need external power to control the transmittance and the manufacturing process is simple, which achieves the purposes of low-cost usage, low manufacturing costs and the increment of the transmittance variation.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for producing a porous thin film with adjustable light transmittance, comprising steps of:
   removing water from a polymer to obtain a dry polymer;
   mixing the dry polymer with a salt and a solvent to obtain a first solution; wherein the salt is lithium chloride with 30-50 wt % weight ratio of the salt over the polymer;
   completely dissolving the salt from the first solution by ultra sonic to form a second solution;
   coating the second solution on a glass plate to form a solution thin film;
   obtaining a composite thin film by placing the solution thin film into an exhaust cabinet;
   washing out the salt from the composite thin film to obtain a porous thin film; and
   adjusting a light transmittance the porous thin film by wetting or drying the porous thin film.

2. The method for producing a porous thin film with adjustable light transmittance as claimed in claim 1, wherein the polymer is a polyacrylonitrile.

3. The method for producing a porous thin film with adjustable light transmittance as claimed in claim 1, wherein the solvent includes a dimethyl formamide and a dimethyl-acetylated amine.

4. The method for producing a porous thin film with adjustable light transmittance as claimed in claim 1, wherein the coating step is proceeded under an environment of a relative humidity ranging from 10 to 95%.

5. The method for producing a porous thin film with adjustable light transmittance as claimed in claim 3, wherein the solvent further comprises dimethyl sulfoxide, toluene, or acetone.

6. The method for producing a porous thin film with adjustable light transmittance as claimed in claim 1, wherein the porous thin film has different spectral transmittance between dry and water-saturated state.

7. The method for producing a porous thin film with adjustable light transmittance as claimed in claim 1, wherein the polymer is one selected from the following group consisting of: polytetrafluoroethylene, hydrophilic thermoplastic polyurethanes, polyamides, and Polyethylene terephthalate.

8. A method for producing a porous thin film with adjustable light transmittance, comprising steps of:
   removing water from a polymer to obtain a dry polymer;
   mixing the dry polymer with a salt and a solvent to obtain a first solution, wherein the salt is lithium chloride with 30-50 wt % weight ratio of the salt over the polymer, and the solvent is a mixture of dimethyl formamide and dimethyl-acetylated amine in 1:1 volume ratio;
   completely dissolving the salt from the first solution by ultra sonic to form a second solution;
   coating the second solution on a glass plate to form a solution thin film;
   obtaining a composite thin film by placing the solution thin film into an exhaust cabinet;
   washing out the salt from the composite thin film to obtain a porous thin film; and
   adjusting the light transmittance by wetting or drying the porous thin film.

* * * * *